(12) United States Patent
Sullivan et al.

(10) Patent No.: US 7,966,310 B2
(45) Date of Patent: Jun. 21, 2011

(54) METHOD, SYSTEM, AND SOFTWARE FOR CORRECTING UNIFORM RESOURCE LOCATORS

(75) Inventors: Marc Sullivan, Austin, TX (US); Philip T. Kortum, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 10/996,726

(22) Filed: Nov. 24, 2004

(65) Prior Publication Data
US 2006/0112094 A1 May 25, 2006

(51) Int. Cl.
*G06F 7/00* (2006.01)
*G06F 17/30* (2006.01)

(52) U.S. Cl. ........ 707/709; 707/710; 707/716; 709/214; 709/223

(58) Field of Classification Search .................. 707/1–5, 707/10, 709, 710, 716; 715/533, 513, 532; 709/217–218, 203, 226, 245, 220, 223, 214
See application file for complete search history.

(56) References Cited

U.S. PATENT DOCUMENTS

| | | | | |
|---|---|---|---|---|
| 5,892,919 A * | 4/1999 | Nielsen | .......................... | 709/228 |
| 5,907,680 A * | 5/1999 | Nielsen | .......................... | 709/228 |
| 6,009,459 A * | 12/1999 | Belfiore et al. | ................ | 709/203 |
| 6,092,100 A * | 7/2000 | Berstis et al. | ................. | 709/203 |
| 6,119,167 A * | 9/2000 | Boyle et al. | ..................... | 709/234 |
| 6,173,406 B1 * | 1/2001 | Wang et al. | ......................... | 726/3 |
| 6,243,741 B1 * | 6/2001 | Utsumi | ........................... | 709/208 |
| 6,311,216 B1 * | 10/2001 | Smith et al. | .................... | 709/226 |
| 6,332,158 B1 * | 12/2001 | Risley et al. | ................... | 709/219 |
| 6,424,983 B1 * | 7/2002 | Schabes et al. | ................ | 715/533 |
| 6,510,461 B1 * | 1/2003 | Nielsen | .......................... | 709/224 |
| 6,519,626 B1 * | 2/2003 | Soderberg et al. | ............. | 709/203 |
| 6,529,187 B1 * | 3/2003 | Dickelman | .................... | 709/245 |
| 6,556,984 B1 * | 4/2003 | Zien | ................................... | 707/2 |
| 6,658,662 B1 * | 12/2003 | Nielsen | ......................... | 725/109 |
| 6,845,475 B1 * | 1/2005 | He | ................................... | 714/53 |
| 6,876,997 B1 * | 4/2005 | Rorex et al. | ...................... | 707/10 |
| 6,941,300 B2 * | 9/2005 | Jensen-Grey | ................. | 707/710 |
| 7,043,690 B1 * | 5/2006 | Bates et al. | .................... | 715/234 |
| 7,136,932 B1 * | 11/2006 | Schneider | ..................... | 709/245 |
| 7,188,138 B1 * | 3/2007 | Schneider | ..................... | 709/203 |
| 7,194,552 B1 * | 3/2007 | Schneider | ..................... | 709/245 |
| 7,243,305 B2 * | 7/2007 | Schabes et al. | ................ | 715/257 |
| 7,289,519 B1 * | 10/2007 | Liskov | ........................... | 709/217 |
| 7,296,019 B1 * | 11/2007 | Chandrasekar et al. | ........... | 707/6 |
| 7,346,605 B1 * | 3/2008 | Hepworth et al. | ................. | 707/3 |

(Continued)

OTHER PUBLICATIONS

Shimamura et al.—"A Domain Cluster Interface for WWW Search"—Database and Expert Systems Applications, 1998, Proceddings, 9th International Conference, Aug. 25-28, 1998 (pp. 1-6).*

(Continued)

*Primary Examiner* — Shahid A Alam
*Assistant Examiner* — Anh Ly
(74) *Attorney, Agent, or Firm* — Jackson Walker L.L.P.

(57) ABSTRACT

A uniform resource locator (URL) entered into a browser may be altered to correct misspellings or other errors in the URL. The prefix, the domain name and the domain extension may all be spell checked, compared with lists of homophones, compared with commonly misspelled URLs, and compared with similar URLs that have been previously successfully resolved. The erroneous URL, or portions thereof, may be automatically corrected so that the correction is transparent to the user, or a list of possible substitutions may be presented to the user.

11 Claims, 3 Drawing Sheets

U.S. PATENT DOCUMENTS

| | | | |
|---|---|---|---|
| 7,376,752 B1* | 5/2008 | Chudnovsky et al. | 709/245 |
| 7,562,153 B2* | 7/2009 | Biliris et al. | 709/238 |
| 7,725,452 B1* | 5/2010 | Randall | 707/709 |
| 7,853,719 B1* | 12/2010 | Cao et al. | 709/245 |
| 2002/0052912 A1* | 5/2002 | Griswold et al. | 709/200 |
| 2002/0059421 A1* | 5/2002 | Hendren, III | 709/224 |
| 2002/0078233 A1* | 6/2002 | Biliris et al. | 709/238 |
| 2002/0103820 A1* | 8/2002 | Cartmell et al. | 707/500 |
| 2002/0133514 A1* | 9/2002 | Bates et al. | 707/501.1 |
| 2002/0143888 A1* | 10/2002 | Lisiecki et al. | 709/214 |
| 2002/0147774 A1* | 10/2002 | Lisiecki et al. | 709/203 |
| 2002/0156917 A1* | 10/2002 | Nye | 709/238 |
| 2002/0188448 A1* | 12/2002 | Goodman et al. | 704/254 |
| 2002/0194373 A1* | 12/2002 | Choudhry | 709/242 |
| 2003/0014450 A1* | 1/2003 | Hoffman | 707/533 |
| 2003/0041147 A1* | 2/2003 | van den Oord et al. | 709/227 |
| 2003/0110295 A1* | 6/2003 | Suzuki et al. | 709/245 |
| 2003/0233423 A1* | 12/2003 | Dilley et al. | 709/214 |
| 2004/0003115 A1* | 1/2004 | Mason | 709/245 |
| 2004/0019697 A1* | 1/2004 | Rose | 709/245 |
| 2004/0030780 A1* | 2/2004 | Walters | 709/225 |
| 2004/0049388 A1* | 3/2004 | Roth et al. | 704/251 |
| 2004/0093567 A1* | 5/2004 | Schabes et al. | 715/533 |
| 2004/0220903 A1* | 11/2004 | Shah et al. | 707/3 |
| 2005/0235031 A1* | 10/2005 | Schneider et al. | 709/203 |
| 2006/0026128 A1* | 2/2006 | Bier | 707/3 |
| 2006/0112066 A1* | 5/2006 | Hamzy | 707/1 |
| 2006/0129543 A1* | 6/2006 | Bates et al. | 707/3 |
| 2006/0167862 A1* | 7/2006 | Reisman | 707/3 |
| 2007/0283254 A1* | 12/2007 | Hamzy | 715/533 |
| 2008/0005127 A1* | 1/2008 | Schneider | 707/10 |
| 2008/0016233 A1* | 1/2008 | Schneider | 709/230 |

OTHER PUBLICATIONS

Gandhi et al.—"Domain Name Based Visualization of Web Histories in a Zoomable User Interface"—proceedings 11th International Conference, Database and Exapert Systems Applications, 2000 (Sep. 4-8, 2000) (pp. 591-598).*

* cited by examiner

METHOD, SYSTEM, AND SOFTWARE FOR CORRECTING UNIFORM RESOURCE LOCATORS

TECHNICAL FIELD OF THE DISCLOSURE

This invention relates generally to uniform resource locators (URLs), and more particularly to correcting misspelled or otherwise unresolvable URLs.

BACKGROUND

The term "uniform resource locator" (URL) refers to an addressing technique used to identify resources on the Internet or on a private intranet. To access information, e.g. web content, stored on a computer connected to the Internet, a user may type a URL into a text entry block provided by an Internet browser. The browser generally submits the URL to a domain name server, which translates the URL into an Internet protocol (IP) address. The IP address identifies the particular computer that holds the desired information.

A common problem associated with manually typing URLs into a browser, is that the user may enter an incorrect URL. The user may, for example, make a typing error, incorrectly guess at the spelling of a URL, or the like.

Most currently available web browsers provide only minimal assistance in correcting a mis-entered URL. Generally, the browser's assistance is limited to autocompletion of partial words. More robust error correction and spellchecking methods are used by some Internet search engines. Google, for example, uses the frequency with which users enter a particular term as one measure of attempting to correct the spelling of a URL. Some browsers provide comparison of a URL entered into the browser with URLs that have previously successfully resolved.

Other browsers provide the URL to a server, which checks directory and file names present on the server against corresponding components of the entered URL, and returns a list of possible correct spellings to the requestor based on available files. Other browsers generate a list of candidate URLS using a fuzzy URL detection scheme.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
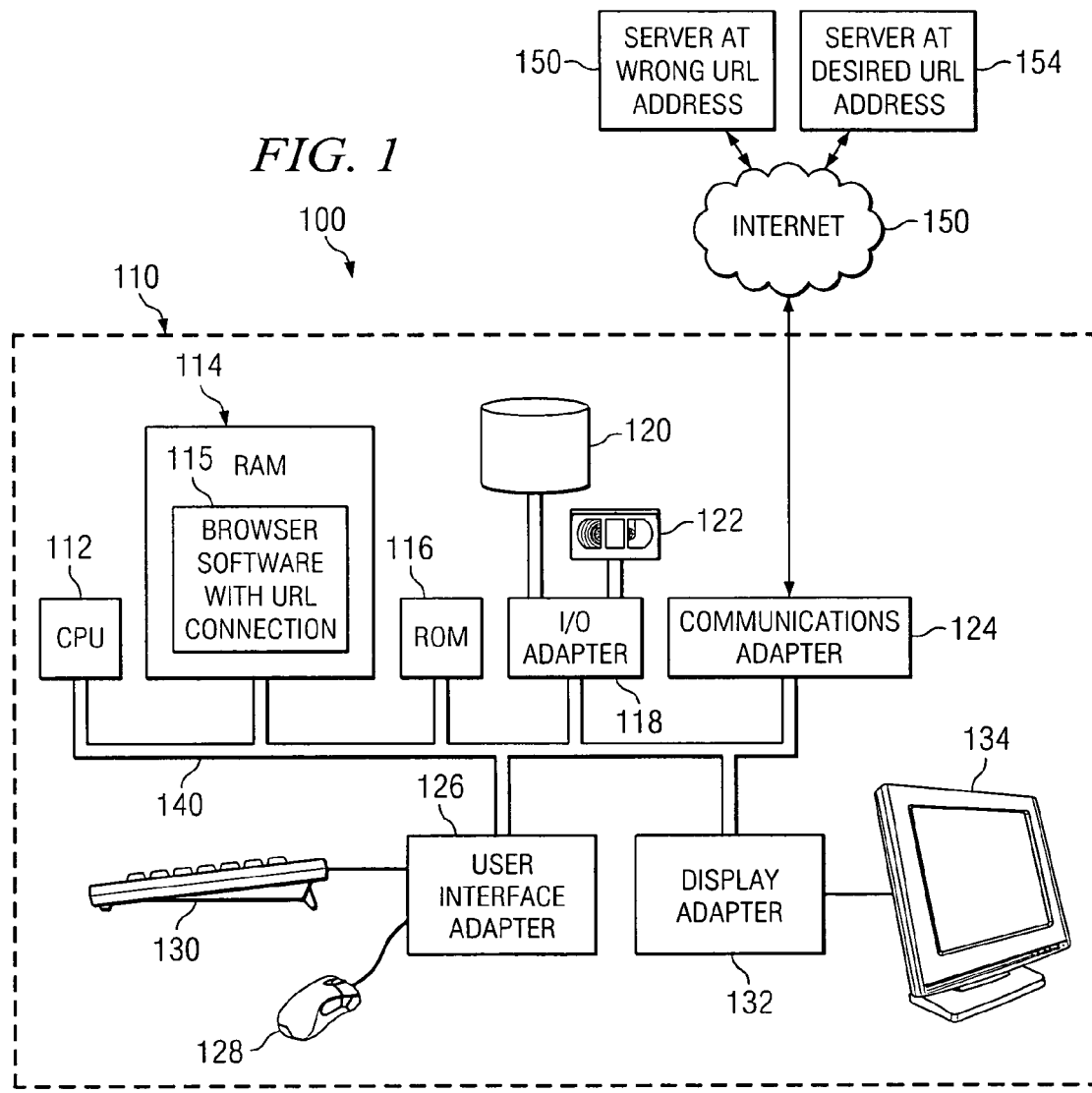
FIG. 1 is a block diagram illustrating a network including an information handling system capable of providing uniform resource locator (URL) correction according to an embodiment of the present disclosure.
Figure 2:
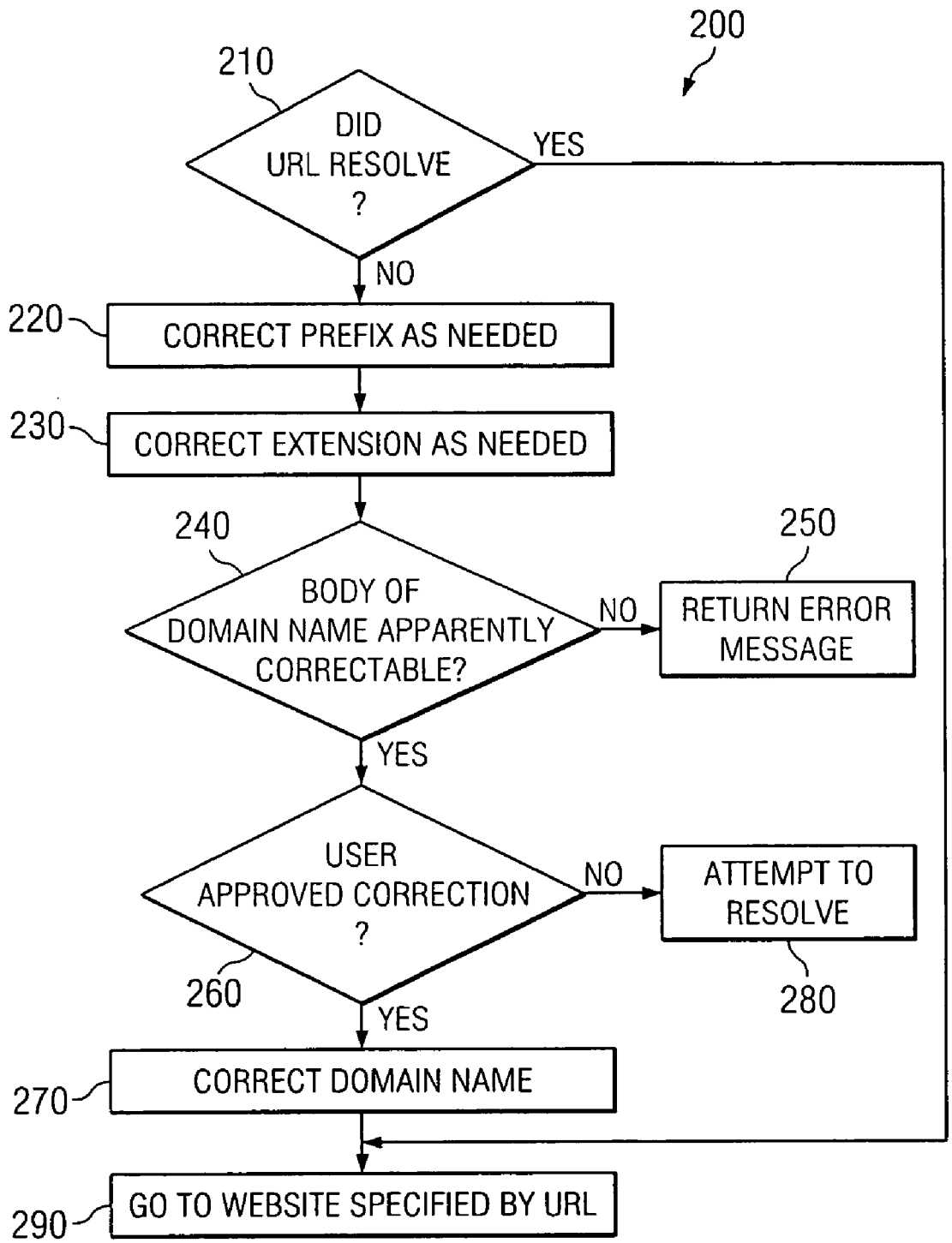
FIG. 2 is a flow diagram illustrating a method of correcting a URL according an embodiment of the present disclosure.
Figure 3:
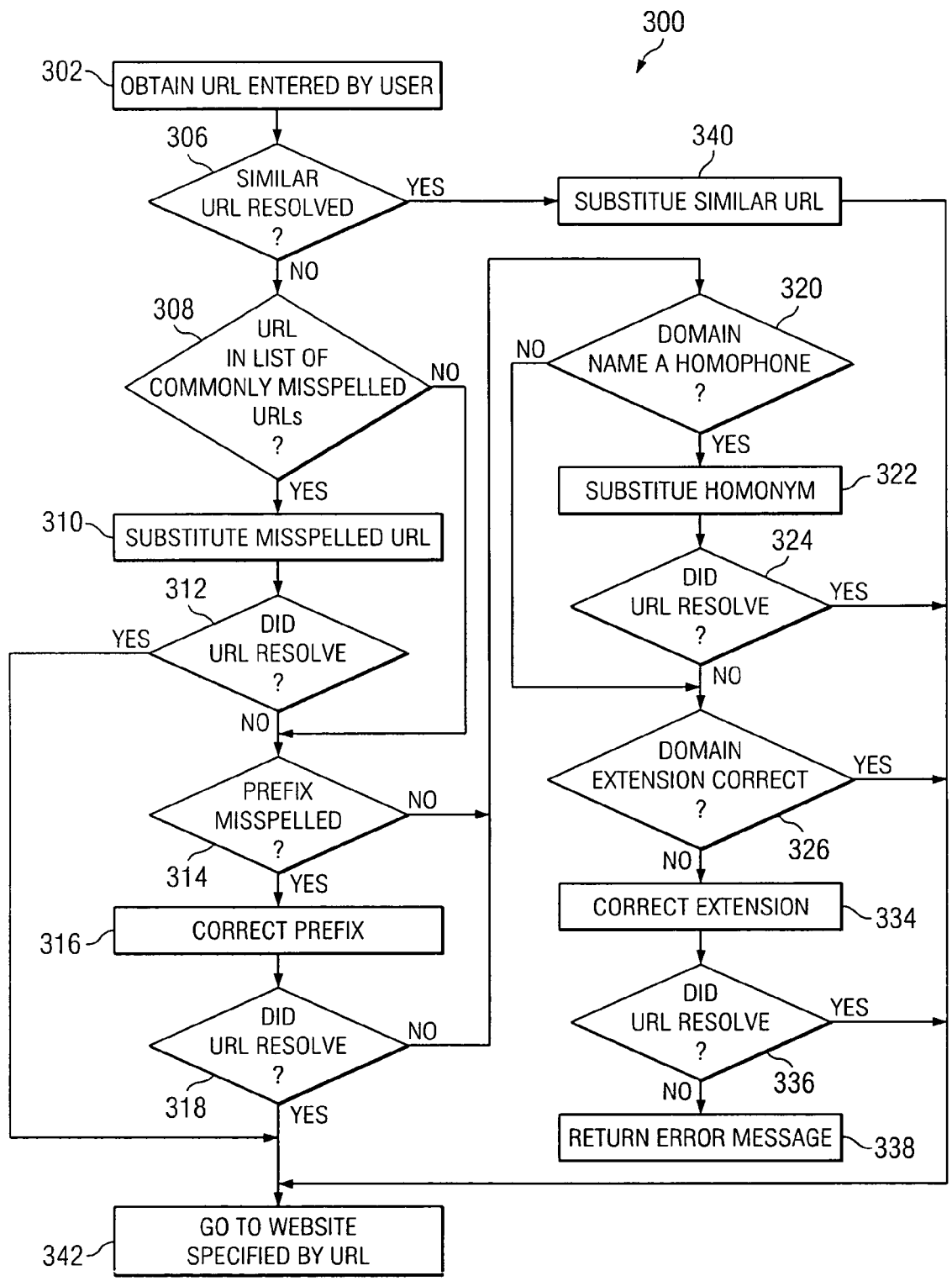
FIG. 3 is a flow diagram illustrating a URL correction method according to another embodiment of the present disclosure.

Preferred embodiments and their advantages are best understood by reference to FIGS. 1 through 3, wherein like numbers are used to indicate like and corresponding parts.

If a user enters a URL that does not resolve, e.g. there is no computer with an IP address corresponding to the entered URL, software, e.g. a browser, may include functionality that allows the browser to correct the URL. The entire URL may be corrected, or only a portion thereof. For example, the prefix of the URL, e.g. "www.", the body of the URL, e.g. "USPTO", and/or the domain extension of the URL, e.g. ".gov", may be corrected. Correcting the URL may involve comparing the entered URL to a homophone/homonym list, a list of previously resolved URLs, a list of commonly misspelled words, or other techniques as described below.

Referring first to FIG. 1, a network 100, which includes information handling system 110 connected to servers 152 and 154 via internet 150, is illustrated according an embodiment of the present disclosure. Information handling system 110 includes central processing unit (CPU) 112 connected to various subsystems and peripherals via communications bus 140. Also connected to communications bus 140 are random access memory (RAM) 114, read-only memory (ROM) 116, I/O adapter 118, communications adapter 124, display adapter 132 and user interface adapter 126.

RAM 114 may include static dynamic RAM (SD RAM), double data rate RAM (DDR RAM), synchronous RAM (SRAM) or other suitable types of RAM. Generally, RAM 114 holds programs and data to be executed by CPU 112. ROM 116 may include electrical erasable programmable read-only memories (EEPROM) or other types of non-volatile memories. ROM 116 is generally used to hold basic input/output system (BIOS) instructions used by CPU 112 during power up, or other types of information that may be required to be available to CPU 112 on a non-transitory basis.

In the illustrated embodiment, I/O adapter 118 is shown connected to disk drive 120 and tape drive 122. Disk drive 120 may be, in one embodiment, an electro-magnetic storage medium, such as a hard disk drive, or a collection of disk drives, e.g. a redundant array of independent disks (RAID). Tape drive 122 may be a magnetic storage tape, such as those used for back up and archival purposes, or some other suitable type of analog or digital tape drive useful for storing information that may be used by CPU 112. Although not illustrated, other types of drives and/or storage devices may be connected to I/O adapter 118. For example, various optical drives, compact disk (CD) drives, digital video disk (DVD) drives, and the like may also be connected to information handling system 110 through I/O adapter 118 or through a separate I/O adapter configured to control particular storage devices.

User interface 126 may be used to provide connection for various devices, such as mouse 128 and keyboard 130, that allow information handling system 110 to receive input from, and provide input to, a user. Display adapter 132 is also used in the illustrated embodiment to provide video signals to display 134. Communications adapter 124 may be an Ethernet adapter, a token ring adapter, a satellite interface digital subscriber link (DSL) adapter, or any of various other subsystems adapted to communicate via a network or otherwise.

In the illustrated embodiment, information handling system 110 may connect to server 152 or 154 through Internet 150. Browser software stored in RAM 114 is executed by CPU 112 to display a browser on display 134. A user may enter a URL into the browser displayed on display 134 using keyboard 130. Assuming that the user desires to download a web page from server 154. The user may use keyboard 130 to type in the URL corresponding to the address of server 154. If, however, the user mistypes or otherwise incorrectly enters the desired URL, rather than connecting to server 154, information handling system 110 may connect to the server at an incorrect URL address 152. Alternatively, if there is no server or other machine connected to Internet 150, which corresponds to the URL entered by the user, the URL entered by the user will not resolve.

Examples of some types of errors that may result in a user entering a URL incorrectly include typing errors, guessing at spelling, miscommunication of the URL to the user, and domain-name extension errors. A typing error may occur, for example, where a user intends to type in "www.USPTO.gov", but instead types in "www.USPRO.gov". The mistyped URL may link to a web page that is completely unrelated to the original, desired web page. In some instances, business desiring to profit from such mistyping errors will establish websites that display competitor's websites to users who mistype a URL, and in some cases, mistyped URLS will result in accessing websites that display adult content, which can prove offensive to some and may harm a business's reputation.

Errors in entering a URL may also occur if a user guesses at the spelling of an unfamiliar word. For example, a user may believe that "cingular" is spelled "singular". Such misspelled URLs are subject to the same problems as mistyped URLs, but have the additional disadvantage that the user may give up trying to enter the correct URL, since in the user's mind, the URL has already been entered correctly. Another common source of incorrect URLs occurs when a user hears the name of a URL, but misinterprets the name. For example, a user may type in "www.house4sale.com" instead of "www.houseforsale.com". As another example, the user may hear "houseforsale.com" rather than "www.housesforsale.com". Finally, domain extension errors can occur if a user mistakenly assumes that, for example, the URL should end in ".com" rather than ".gov", ".net", ".org" or the like.

At least one embodiment of the present disclosure accounts for entry errors across the entire URL, including the prefix, the main body and the extension. Additionally, multiple types of errors, including typing errors, guessing errors, miscommunication errors and domain extension selection errors, are addressed by various embodiments. Such embodiments provide improved functionality over solutions which may only perform substitutions if the prefix or extension is missing completely, solutions that rely on external servers, solutions that perform only basic spell checking, and over solutions that employ simple look-ahead completion techniques based on entries previously typed into the browser.

Referring next to FIG. 2, a method 200 will be discussed according an embodiment of the present disclosure. Method 200 begins at 210, where the method determines whether the URL entered by the user resolved. If the URL did not resolve, method 200 proceeds to 220 where the prefix of the URL is corrected as needed. If, for example, the user inadvertently typed in only "ww.", rather than "www.", the correct prefix will be substituted. In at least one embodiment, correction of the prefix may work on two levels. First, a pattern match check may be performed to look for the most probable correct entries. So, for example, if a user typed in "ww.USPTO.gov", the system would pattern match the mistyped "ww." and substitute "www.". On the second level, the system may perform a substitution if the URL as typed does not resolve. For example, if a user typed in "yahoo.com", the system would see that "yahoo.com" does not resolve and would then append the "www." prefix to the mistyped URL for completion.

The method then proceeds to 230, where the extension is corrected as needed. The number of domain extensions is limited, and spelling errors on these domains may be detected and corrected using, for example, pattern matching rules. The rules set for determining a probable correct domain extension includes, in at least one embodiment, a highest pattern match score or a most common typing mistakes template that accounts for frequent mistakes. In at least one embodiment, method 200 may first use the domain extension that most closely matches the correct number of matching letters. For example, since ".xom" has the highest match pattern to ".com", ".com" would be substituted. A second rule that may employed would be to use empirical information, such as the proximity of certain keys that make certain mistakes more likely than others. So, for example, since the C and the X keys are proximate to each other, ".xom" is probably frequently mistyped for ".com". Thus, ".com" would be substituted for ".xom". In an alternate embodiment, if a URL appears to be otherwise correct, other domain extensions may be tried in order of frequency use until a valid URL is achieved. Thus, if a URL ending ".com" does not resolve, then ".com" may be changed to ".org". Thus, a user who typed in "www.uspto.com" as the desired URL could have the system correct the URL to "www.uspto.gov".

The method proceeds to 240, where the body of the domain name is evaluated to determine if it is apparently correctable. To determine if the domain name is apparently correctable, at least one embodiment of the present disclosure looks to the browser history list, which, in one embodiment, includes a listing of URLs typed into the browser. Each of the URLs typed into the browser is examined to see if a URL similar to the entered URL successfully resolved. If a similar URL has been successfully resolved, the previously successfully resolved URL will be used in place of the current URL, which did not resolve. For example, if a user mistyped "www.cmm.com" and an examination of the history that "www.cnn.com" had been visited before, then a substitution could be made.

In at least one embodiment, an entered URL is determined to be similar if the entered URL differs from a successfully resolved URL by fewer than a predetermined number of characters, or if the entered URL differs from a previously resolved URL by less than a certain percentage of characters. For example, two URLs may be similar if they differ by less than two characters. Alternatively, the two URLs may be considered similar if less than two out of every five characters are different. In yet other embodiments the number of characters in each URL may also be taken into account.

The system may also scan a list of common misspellings, using a spell detection/correction scheme that has been adapted to accept unparsed text. So, for example, "houses4sale" could be recognized as "houses for sale". Many "spam" websites take advantage of such misspellings, and similar lists could be generated and utilized by a browser to avoid accessing undesired sites through misspelling.

If a typed URL still does not resolve, the system may look at a homophone and/or a homonym list to determine if a homonym or homophone may be substituted for the incorrect URL. So, for example, if the user had mistyped "www.homes4sale" and this URL did not resolve, a substitution can be made using "www.homesforsale.com".

Assuming that a substitution can be made based on the browser history list, a list of common misspellings, or a homonym/homophone list, then the user may be presented with a listing of possible websites at 260. If no substitution is apparent at 240, then an error message can be returned at 250 to notify the user that the entered URL is unresolvable. If the user approves the correction at 260, for example by selecting one of the presented alternatives, the method proceeds to 270, where the domain name is corrected according to the selection. After the domain name is corrected, the method proceeds to the website specified by the URL at 290. If the user does not approve any of the corrections presented at 260, the method proceeds to 280, and attempts to resolve the URL without any changes to the main body of the domain name.

Although method 200 has been described as having elements performed in a particular order, other embodiments of the present invention may perform the same actions in a different order, perform different actions in place of one or more of the illustrated and discussed actions, or have additional or fewer actions than those illustrated. For example, at least one embodiment of the present disclosure may automatically correct the body of the domain name at 240 without requesting user approval at 260. Still other embodiments determine whether a domain name is apparently correctable and request user approval for the correction prior to correcting the prefix or extension. Yet further embodiments may determine if the domain name is correctable, determine if the prefix is correctable and determine if the extension is correctable and provide suggestions to correct one or more of these portions of the URL to a user for his approval prior to performing any corrective measures or substitutions. In at least one embodiment, some or all possible corrections may be evaluated prior to determining if the entered URL resolves. In one such embodiment, a URL that appears to have been mis-entered, e.g. the URL is similar but not identical to a previously resolved URL, will cause a pop-up list of suggested URLs to be displayed.

Referring next to FIG. 3, another method according an embodiment of the present disclosure is discussed, and is designated generally as method 300. Method 300 begins at 302, by obtaining a URL which is entered into a browser or similar program. After obtaining the URL at 302, method 300 proceeds to 306, where the entered URL is compared to a list of similar URLs that have previously resolved. A list of URLs previously entered into the browser can be obtained from a browser history list, which is maintained in most commercial available browsers. Although the history lists in some browsers include all URLs that have been typed into the browser, regardless of whether the particular URL resolved or not, information about whether a particular URL in the history list previously resolved can be appended to, or linked to, the history list. So, for example, if an error message is returned in response to an attempt to access a particular URL, a linked list, table or any other suitable data structure known to those skilled in the art can be used to associate the error message with the entered URL.

If a successfully resolved URL similar to the entered URL is identified at 306, the similar URL is substituted at 340. Method 300 directs the user to the website specified by the substitute URL at 342. If, however, the substitute URL does not resolve, the method proceeds to 308, where method 300 determines whether the URL entered by the user is included in a list of commonly misspelled URLs. The list of commonly misspelled URLs may be obtained, for example, from a commercially available dictionary of misspelled words. Alternatively, user surveys, tests, or data obtained through other empirical methods may be used to construct a list of commonly misspelled URLs. Regardless of the source of the list of misspelled URLs, if the URL entered by the user is included in the list of commonly misspelled URLs, then the method proceeds to 310 where the misspelled URL is substituted for a correctly spelled URL in the list of commonly misspelled URLs. Method 300 then proceeds to 312, where it determines whether the substituted URL resolves. If the substituted URL does resolve, the method accesses the website specified by the substituted URL at 342.

If, at 308, the entered URL is not included in the list of commonly misspelled URLs, or if a substituted URL does not resolve at 312, the method proceeds to 314, where method 300 checks for a misspelled or missing prefix. If the prefix is misspelled or missing it is corrected at 316, and the URL with the corrected prefix is tested at 318 to determine if it will resolve. If the URL with the corrected prefix does resolve, the user is directed to the website specified by that URL. If, however, the URL does not resolve, the method proceeds to 320. Likewise, if at 314 it is determined that the prefix is correctly spelled, the method also proceeds to 320.

At 320, method 300 determines whether the domain is a homophone or homonym. So, for example, if the user has entered "right" when instead the proper URL should have been "write" method 300 will recognize that "right" is a homophone/homonym of "write" and make the appropriate substitution at 322. The URL including the substitution is tested at 324 to determine if it resolves. If the corrected URL does resolve, the user is directed to the website specified by the URL at 342. If, however, the URL does not resolve, or if the URL entered by the user does not include a domain name in the homonym list, then the method proceeds to 326.

At 326, method 300 determines whether the domain extension is correct. If the domain extension is correct, the user is directed to the website specified by the URL. If the domain extension is incorrect, the method proceeds to 334 where it corrects the domain extension. Once the domain extension has been corrected, method 300 proceeds to 336, and attempts to resolve the URL. If the URL resolves, the user is directed to the website specified by the corrected URL at 342. If the URL does not resolve, an error message is returned at 338.

It will be appreciated that various alterations to the specific steps discussed with reference to FIG. 3 may be made without departing from the spirit and scope of the present disclosure. For example, rather than checking after each substitution to determine if a URL resolves, multiple possible substitutions may be explored by method 300 and the user may then be presented with a listing of possible substitutions from which to choose. Additionally, particular implementations of the present disclosure may implement only a portion of the method described with reference to FIG. 3. Various other logical alterations may be employed skilled in the art consistent with the teachings set forth herein.

Although the present invention has been described in detail, it should be understood that various changes, substitutions, and alterations can be made hereto without departing from the spirit and scope of the invention as defined by the appended claims.

What is claimed is:

1. A computer-implemented method comprising:
    responsive to an entered uniform resource locator (URL) not resolving, the entered URL comprising an entered domain extension representing a top level domain, an entered domain name first portion representing a second level domain, and an entered domain prefix representing a sub-domain of the second level domain, modifying the URL including:
    responsive to determining that the entered URL is similar to a previously resolved URL, using the previously resolved URL as the modified URL;
    responsive to determining that the entered URL is not similar to a previously resolved URL, performing the following operations in the following sequence until the operations are exhausted or a modified URL resolves:
    responsive to determining an error in the entered domain prefix, modifying the entered URL by substituting a corrected domain prefix for the entered domain prefix and attempting to resolve the modified URL;
    responsive to determining an error in the entered domain extension, modifying the URL by substituting a proper domain extension for the entered domain extension of the entered domain name and attempting to resolve the modified URU; and responsive to determining a homophone for the domain name first portion, modifying the URL by substituting the homophone of the entered domain name first portion for the entered domain name first portion and attempting to resolve the modified URL; and responsive to the modified URL resolving, retrieving a web page associated with the modified URL;

generating a request for permission to correct the URL prior to correcting an erroneous portion of the URL;

correcting a prefix of the URL independent of a response to the request; and correcting the first portion of the domain name consistent with a response to the request.

2. The computer-implemented method of claim 1, wherein:
the entered URL is entered by a user of a local information handling system; and
the local information handling system performs one or more of the modifying operations.

3. An information handling system comprising:
a processor;
memory operably associated with said processor; and
a program of instructions storable in said memory and executable by said processor, said program of instructions comprising instructions to perform the following operations sequentially:
identify an input uniform resource locator (URL) as erroneous wherein the input URL includes a top level domain, a second level domain, and a prefix comprising a sub-domain of the second level domain;
determine a first corrected URL by correcting the prefix when the prefix is incorrect;
attempt to resolve the first corrected URL;
responsive to the first corrected URL not resolving, determine a second corrected URL by correcting the top level domain when the top level domain is incorrect;
attempt to resolve the second corrected URL;
responsive to the second corrected URL not resolving, determine a third corrected URL by correcting the sub-domain of the input URL when the sub-domain is incorrect;
attempt to resolve the third corrected URL; and
generate a request for permission to correct the URL prior to determining a corrected URL.

4. The information handling system of claim 3, wherein said program of instructions further comprises at least one instruction to correct the second level domain name based on previously resolved URLs.

5. The information handling system of claim 3, wherein said program of instructions further comprises at least one instruction to correct the second level domain name based on homophones.

6. A memory tangibly embodying a program of executable instructions, said program of instructions comprising instructions to:
identify a uniform resource locator (URL) as erroneous, wherein the input URL includes a top level domain, a second level domain, and a prefix comprising a sub-domain of the second level domain, and, in response, perform the following operations in sequence:
generate a request for permission to correct the input URL prior to determining a corrected URL;
generate a first corrected URL by selectively altering the prefix responsive to determining the prefix is an erroneous prefix independent of a response to the request;
responsive to the first corrected URL not resolving, generate, consistent with the response to the request, a second corrected URL by selectively altering the top level domain responsive to determining the top level domain is an erroneous top level domain;
responsive to the second corrected URL not resolving, generate, consistent with the response to the request, a third corrected URL by selectively altering the second level domain responsive to determining the second level domain is an erroneous second level domain.

7. The memory of claim 6, further comprising at least one instruction to correct the second level domain based on a comparison of the second level domain with entries included in a list comprising misspelled words.

8. The memory of claim 6, further comprising at least one instruction to correct the second level domain based on previously resolved URLs.

9. The memory of claim 6, further comprising at least one instruction to correct the second level domain based on homophones of the body portion.

10. The memory of claim 6, wherein said program of instructions includes at least one instruction to determine if the erroneous URL differs from a previously resolved URL by less than a specified number of characters.

11. The memory of claim 6, wherein said program of instructions includes at least one instruction to determine if the erroneous URL differs from a previously resolved URL by less than a specified percentage of characters.

\* \* \* \* \*